United States Patent
Liu et al.

(10) Patent No.: US 10,517,087 B2
(45) Date of Patent: Dec. 24, 2019

(54) METHOD AND SYSTEM FOR MILLIMETER WAVE (MMWAVE) TO MICROWAVE MULTIPLE-IN MULTIPLE-OUT (MIMO) RELAY

(71) Applicants: Yaozhong Liu, Palos Verdes, CA (US); Rui Zhu, Los Angeles, CA (US)

(72) Inventors: Yaozhong Liu, Palos Verdes, CA (US); Rui Zhu, Los Angeles, CA (US)

( * ) Notice: Subject to any disclaimer, the term of this patent is extended or adjusted under 35 U.S.C. 154(b) by 8 days.

(21) Appl. No.: 16/006,757

(22) Filed: Jun. 12, 2018

(65) Prior Publication Data

US 2019/0191419 A1    Jun. 20, 2019

Related U.S. Application Data

(60) Provisional application No. 62/607,233, filed on Dec. 18, 2017.

(51) Int. Cl.
| | |
|---|---|
| *H04W 72/04* | (2009.01) |
| *H04B 7/155* | (2006.01) |
| *H04B 7/0413* | (2017.01) |
| *H04L 5/00* | (2006.01) |
| *H04B 7/026* | (2017.01) |

(52) U.S. Cl.
CPC ......... *H04W 72/042* (2013.01); *H04B 7/026* (2013.01); *H04B 7/0413* (2013.01); *H04B 7/15507* (2013.01); *H04B 7/15528* (2013.01); *H04L 5/0023* (2013.01)

(58) Field of Classification Search
None
See application file for complete search history.

(56) References Cited

U.S. PATENT DOCUMENTS

| | | | |
|---|---|---|---|
| 9,294,162 B2 * | 3/2016 | Nilsson | H04B 5/0018 |
| 2017/0164377 A1 * | 6/2017 | Ho | H04W 16/28 |
| 2017/0317734 A1 * | 11/2017 | Moshfeghi | H04W 84/00 |

* cited by examiner

*Primary Examiner* — Hong S Cho
(74) *Attorney, Agent, or Firm* — Che-Yang Chen; Law Offices of Scott Warmuth

(57) ABSTRACT

A method and system of mmWave to microwave MIMO relay (M4R) is disclosed, which combines broad bandwidth of mmWave link and better penetration and the more abundant spatial channels in the microwave band to form high speed wireless links. In one embodiment, it is configured to use frequency translational relay units in RF to connect frequency multiplexing mmWave channels and MIMO microwave channels to realize seamless pathway of information flow and avoid bottleneck in data traffic. System principle and link budget analysis shows that the M4R system may significantly improve the link performance and maximize the channel capacity for high speed outdoor to indoor communications.

8 Claims, 8 Drawing Sheets

METHOD AND SYSTEM FOR MILLIMETER WAVE (MMWAVE) TO MICROWAVE MULTIPLE-IN MULTIPLE-OUT (MIMO) RELAY

CROSS-REFERENCE TO RELATED APPLICATIONS

This application claims priority under 35 U.S.C. § 119 (e) to U.S. Provisional Patent Application Ser. No. 62/607,233, filed on Dec. 18, 2017, the entire contents of which are hereby incorporated by reference.

FIELD OF THE INVENTION

The present invention relates to a communication system, and more particularly to a method and system for millimeter wave (mmWave) to microwave Multiple-In Multiple-Out (MIMO) relay (M4R).

BACKGROUND OF THE INVENTION

The 5G communication systems target on ultra-high data rate over several Giga bits per second. Communication between cellular base-station (BS) and indoor users (IDU) is one of the most common situation in daily life and establishing a high-speed link in this scenario is critical for deployment of 5G systems. Advanced techniques have been proposed to achieve the promised high data rate, such as millimeter wave (mmWave), beamforming, MIMO, etc. Although these techniques may possess potential for high data rate in certain scenarios, they often face challenges in this outdoor-to-indoor access situation.

MmWave is considered as one of key techniques for 5G as its broadband spectrum resource enables high speed data communication. However, the high propagation loss as described by Friis Transmission equation, limits the coverage range of single mmWave BS. Beamforming may be used to extend the range coverage with the trade-off between the high directivity and the angular coverage. In existing techniques, mmWave relay system is proposed to extend the coverage range. However, despite of the propagation loss, the signal strength drops dramatically when mmWave penetrates through obstacles. The outdoor to indoor communication is one of such non-line-of-sight (NLOS) scenarios. Prior researches show that the penetration loss of 28 GHz and 38 GHz signal through common building materials vary from 20 to 40 dB. One may consider using wired connections based on optic fibers. But deployment of optic fibers into existed buildings could be difficult and expensive and thus a wireless link is necessary. On the other hand, direct relay the mmWave to lower frequency bands over relays installed on the windows have been proposed by AT&T solution. The limited bandwidth, however, in the lower frequency bands creates bottleneck of information flow and it cannot support the relay to high speed data links in mmWave.

U.S. Pat. No. 9,294,162 to Nilsson et al. ("the '162 patent") discloses a wireless outdoor-indoor multiple-input multiple-output (MIMO) communications system for communicating with user equipment located inside a physical structure such as a building. The MIMO communication system is comprised of a node having at least two node antennas, wherein the node is configured for line of sight (LOS) wireless MIMO communication with at least two outdoor-indoor repeaters, and of at least two outdoor-indoor repeaters adapted for LOS wireless MIMO communication with the node. The repeaters have at least one repeater antenna each, provided outside the physical structure, for LOS MIMO communication with the node and at least one leaky cable each, provided inside the physical structure, for indoor MIMO communication with the user equipment located inside the physical structure. However, the '162 patent does not teach or suggest using frequency-translational relaying units (RU) to link the broadband mmWave link outside the buildings and the microwave band MIMO link penetrating from outdoor to indoor.

Other researchers disclose that outdoor MIMO and indoor mm Wave point to point communication are united to form the hybrid relay system. Inside a building, frequency multiplexing at mmWave offers broad bandwidth between users and the relay unit. The advantages of low penetration loss at UHF band is utilized to transmit signal from outdoor BS to indoor Relay Unit (RU). As the narrow bandwidth at UHF band cannot match the broad bandwidth at mmWave, MIMO at UHF band is proposed to improve the channel capacity. However, spatial diversity from cellular base-stations to indoor users is usually limited at UHF due to its small angular spread and it conflicts with techniques such as beamforming or SDMA and negatively impact spectrum reutilization.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Figure 1:
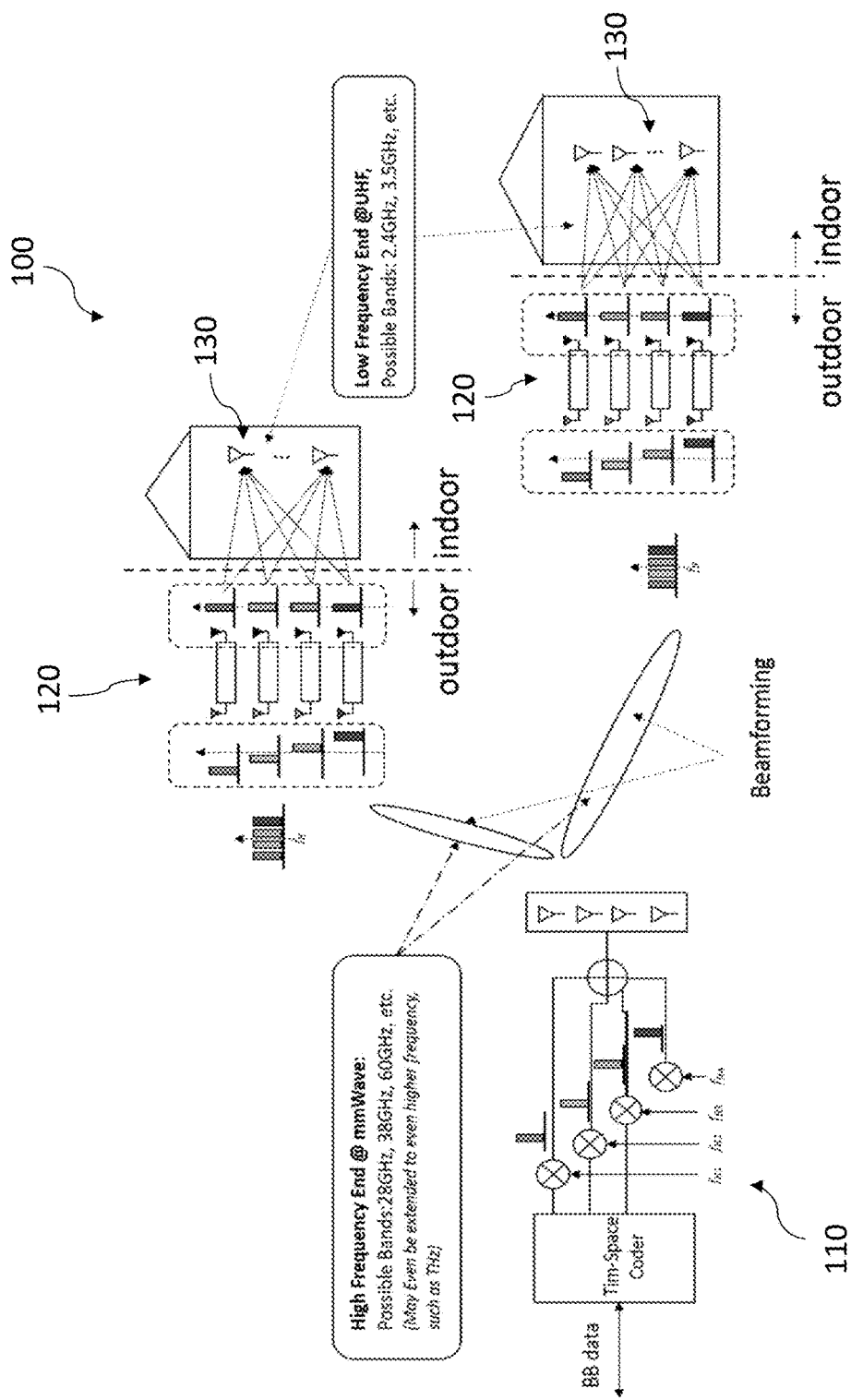
FIG. 1 is a schematic diagram of the mmWave to Microwave MIMO Relay (M4R) system in the present invention.

To solve this outdoor to indoor communication problem, a heterogeneous method and system 100 called millimeter wave (mmWave) to Microwave Multiple-In Multiple-Out (MIMO) Relay (M4R) is disclosed as shown in FIG. 1. The essential idea leverages on the frequency-translational relaying units (RU) 120 to link the broadband mmWave link outside the buildings and the microwave band MIMO link penetrating from outdoor to indoor. In the backhaul link of base-station (BS) 110 to the relay units placed outside the target buildings, mmWave is used for broad bandwidth and beamforming is applied for spatial multiplexing for accessing to multiple buildings. Possible frequency bands to be utilized can be licensed mmWave or ISM bands, such as 28 GHz, 38 GHz or 60 GHz. For short interaction range between the BS 110 and buildings, Tera Hertz (THz) wave can also be employed. Several sets of relay units (RUs) 120 are then placed outside each building and convert the mmWave signal to UHF/SHF band whose penetration loss is lower, such as 2.4-2.5 GHz and 3.5-3.6 GHz ISM band. The RU 120 and transceivers 130 inside the building then form a MIMO link that may operate in a spatial multiplexing mode, whose channel capacity is matched to that of mmWave. It is important to note that each RU 120 performs dual tasks that it not only compensates the propagation loss of mmWave, but also converts the frequency multiplexing in mmWave to spatial multiplexing in microwave MIMO, so the optimum channel capacity can be achieved. With this configuration, the outdoor-to-indoor link can obtain the ambitious data rate required by 5G standard. From the system point of view, MIMO requires the channel measurement, but in M4R, the channel modeling should be done directly from the BS 110 to the indoor transceivers 130 (ID-TRX).

Figure 2:
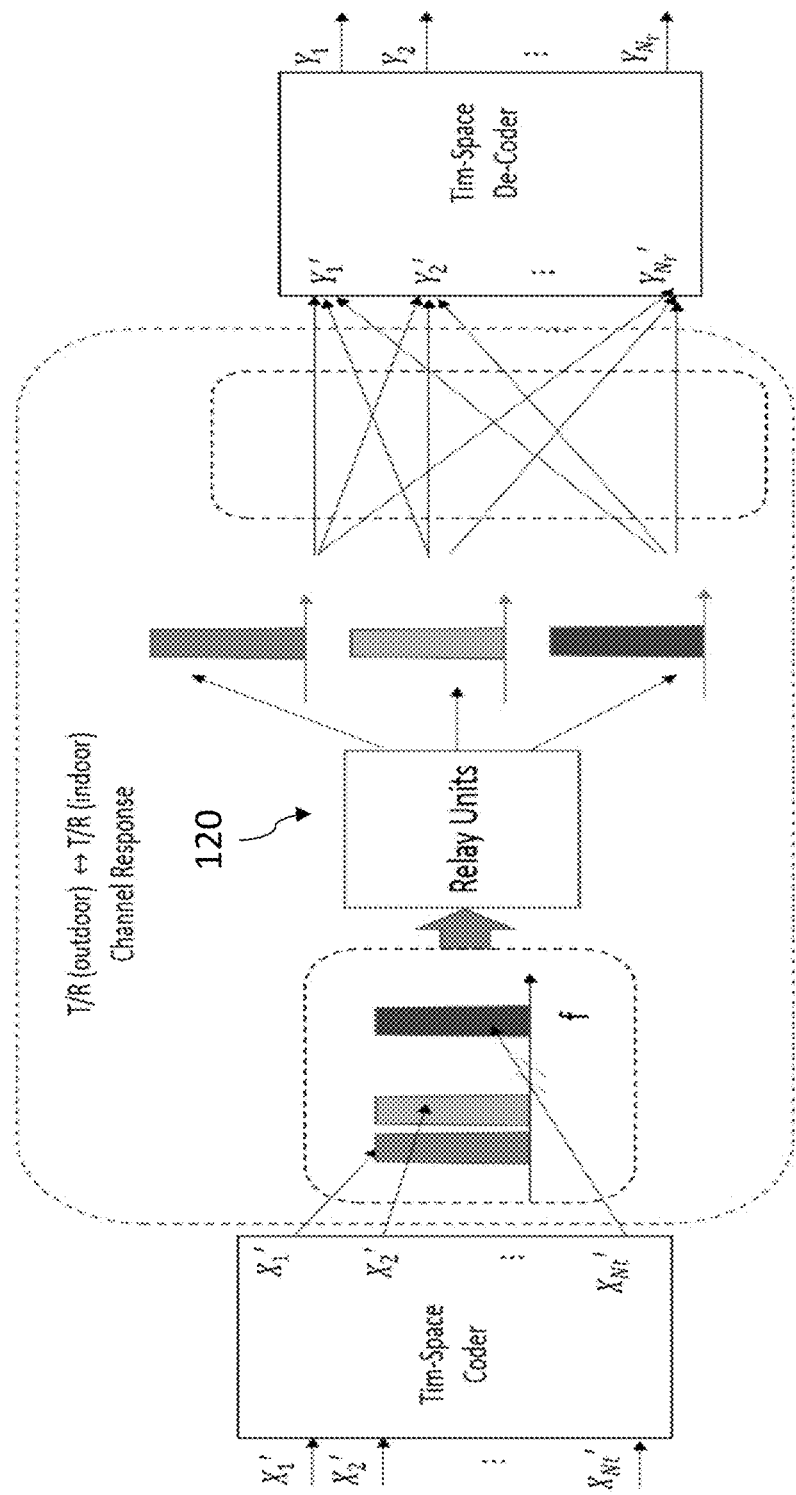
FIG. 2 illustrates a frequency allocation in the M4R link in the present invention.

The BS 110 signal is split into multiple sub-bands, whose bandwidth is matched to the available bandwidth in microwave band. Each RU 120 connects one sub-band at mmWave and one indoor transceiver unit by translating the center frequency from mmWave to microwave for downlink, or microwave to mmWave for uplink. FIG. 2 illustrates the frequency allocation of the M4R system 100. For example, the sub-band at mmWave locates at center frequency of $f_{H,n}$ with bandwidth of $w_d$. Let us assume 2.4 GHz band is used for low frequency end. Then in the downlink path, the $n^{th}$ RU converts this mmWave sub-band to 2.4 GHz ISM with keeping the same bandwidth of $w_d$. The down converted sub-band signal is then transmitted from RU 120 to ID-TRX 130 that all the signals are sharing the same center frequency, but they create a virtual MIMO channel because of the highly scattered propagation circumstances. It is noted that the complete channel of the virtual MIMO is from the BS 110 to RU 120 to ID-TRX 130, so the channel response is composite of mmWave path and microwave path and has to be modeled globally. Therefore, the time-space coding and decoding are executed at BS 110 and ID-TRX 130, while the RU 120 can be simply built in analogue fashion without any signal processing. In fact, this allows very short time latency to be introduced by the relaying operation, which can meet the 5G low latency requirement.

Also, as a relay system, the design of the RUs 120 depends on the link budget. Thus, an estimation of the propagation loss is important. As discussed above, the RUs 120 are the most important bridges to relay the mmWave air interface to the microwave frequency building penetration path, so it must provide enough gain to compensate the high propagation loss in the mmWave channel. In fact, the propagation behavior in either mmWave or microwave could be complicated due to scattering, shadowing, etc., but the loss estimation based on a simplified point-to-point link can be regarded as a good reference for determining the lower bound of the relay gain. For the simplest case, free space Friis Transmission equation can be used to estimate the propagation loss. For mmWave, a free space LOS link from BS 110 to single RU 120 is assumed; while in microwave band, the signal follows a point to point free space transmission but with an additional penetration loss. Based on Friis Transmission Equation, let the power transmitted from BS 110 be $P_{BS,t}$, then the received signal power by the RU 120 is $$P_{RU,r} = P_{BS,t} \cdot G_{BS,t} G_{RU,r} \cdot \left(\frac{\lambda_{mm}}{4\pi}\right)^2 \left(\frac{1}{R_{BU,RU}}\right)^2 \quad (1)$$

$G_{BS,t}$ and $G_{RU,r}$ are the transmitting and receiving antenna gain on BS 110 and RU 120 respectively. $\lambda_{mm}$ is the wavelength of mmWave and $R_{BS,RU}$ is the distance between BS 110 and RU 120. With relay gain of $g_{RU}$ the signal transmitted out from RU 120 to indoor users is $$P_{RU,t} = P_{RU,r} \cdot g_{RU} \quad (2)$$

For the link of RU 120 to ID-TRX 130, let the penetration loss be denoted by $L_{add}$, the power received by the single ID-TRX unit 130 is $$P_{U,r} = P_{RU,t} \cdot G_{RU,t} G_{U,r} \cdot \left(\frac{\lambda_{mw}}{4\pi}\right)^2 \left(\frac{1}{R_{RU,U}}\right)^2 \cdot L_{add} \quad (3)$$

$G_{RU,t}$ and $G_{U,r}$ are the transmitting and receiving antenna gain on RU 120 and ID-TRX 130. $\lambda_{mw}$ is the wavelength of microwave signal, $R_{RU,U}$ is the distance between RU 120 and ID-TRX 130. Let gain of relay unit be denoted by $G_{RU}$ in dB scale, the total path loss can be written as:

$$PL_{M4R} = L_{mm}^{BS-RU} + L_{mw}^{RU-ID} + G_{RU}(\text{dB}) \quad (4)$$

Where $L_{mm}$ and $L_{mw}$ are the propagation loss in dB scale in mmWave and microwave path respectively, $$L_{mm}^{BS-RU} = 10 lg\left(G_{BS,r}G_{RU,r}\left(\frac{\lambda_{mm}}{4\pi}\right)^2\left(\frac{1}{R_{BU,RU}}\right)^2\right) \quad (5)$$

$$L_{mw}^{RU-ID} = 10 lg\left(G_{RU,t}G_{U,r}\left(\frac{\lambda_{mw}}{4\pi}\right)^2\left(\frac{1}{R_{RU,U}}\right)^2 L_{add}^{mw}\right) \quad (6)$$

As beamforming is applied to mmWave, it is reasonable to assume both the TX and RX antennas on the BS 110 has relatively high gain. While for the RU 120 and ID-TRX 130, we can assume the transmitting/receiving antennas has isotropic-like radiation pattern, such as half wavelength dipole.

To obtain an intuitive estimation of the link budget, here we take the following assumptions. For mmWave link, operation frequency is 38 GHz; $R_{BS,RU}$=1000 m; the mmWave antenna aperture $A_{mm}$=10 cm×10 cm for BS transmitting antenna; the receiving antenna on the RU 120 is chosen to be dipole for receiving signal from a broad angle, so $G_{RU,r}$=1.64 dB. For the microwave link, operation frequency is 2.4 GHz and $R_{RU,U}$=50 m. Assuming half wave dipole antenna are used, then $G_{RU,t}$=$G_{U,r}$=1.64 dB. The average penetration loss is $L_{add}^{mw}$=−10 dB for microwave signal. Based on the mmwave antenna aperture, $$G_{BS,t} = \frac{4\pi A_{mm}}{\lambda^2} = 33 \text{ (dB)} \quad (7)$$

The $L_{mm}^{BS-RU}$=−89.4 dB, and $L_{mw}^{RU-INDDOR}$=−80.7 dB, and the total path loss will be $P_{LM4R}$=−171.1 dB+$G_{RU}$.

Note that this calculation is based on an ideal point to point communication link. The high propagation loss indicated by $L_{mm}$ shows that even with the LOS, the mmWave suffers great attenuation and requires a relaying operation. However, for comparison, we can calculate the path loss from RU 120 to indoor if we are using mmWave with same condition and an empirical average penetration loss of $L_{add}^{mm}$=−30 dB:

$$L_{mm}^{RU-ID} = 10\log\left(G_{RU,t}G_{U,t}\cdot\left(\frac{\lambda_{mm}}{4\pi}\right)^2\left(\frac{1}{R_{RU,U}}\right)^2 L_{add}^{mm}\right) \quad (8)$$

Based on the parameters mentioned above, $L_{mm}^{RU-ID}$=−124.7 dB, which is much worse than using microwave band. This reveals that using M4R, the total propagation loss is much better than using mmWave only in the outdoor-to-indoor scenario.

The present invention has the following advantages:

(i) Reduce the Penetration Loss

As the estimated link budget indicates, the propagation loss of the outdoor mmWave needs to be compensated by a relay system, while directly re-transmitting mmWave through buildings causes severe attenuation, as described by $L_{mm}^{RU-ID}$. But in M4R system 100, the relay in microwave band shows great improvement in penetration loss, as shown in $L_{mw}^{RU-INDDOR}$. So the M4R system 100 in the present invention can significantly improve the signal strength for 5G mmWave system for the outdoor-to-indoor scenario. The proposed technique is compliant with all possible mmWave bands, such as 28 GHz, 38 GHz, 60 GHz, etc. Same idea can also be extended for THz wave in certain circumstances.

(ii) Improve the Data Rate and Spectral Efficiency

In the M4R system of the present invention, the frequency translational relay system matches the channel capacity of the mmWave and the microwave band. The broadband frequency resources at high frequency can be fully utilized for indoor users by transforming frequency multiplexing to MIMO spatial multiplexing. So, the M4R system 100 can enable the high-speed data communication as requested in 5G.

The microwave band used between the RUs and indoor transceivers can be allocated to ISM bands with low power emission so that the spectrum can be re-used at nearby locations (iii) Low Latency In M4R, the relay unit is implemented in analogue fashion. The signal processing is done in BS 110 and ID-TRX 130. So, the system has potentials to have low time latency, which can satisfy milli-seconds latency requirement in 5G.

(iv) Easy to be Deployment

Because M4R utilizes wireless channels from outdoor to indoor, deploying the relay unit does not need to modify the existed building structures, so the installment of the system is cost effective.

Based on the principle of the M4R system 100, a few possible implementation plans can be illustrated as below. The whole system can be categorized into three parts: the transceiver 112 of the base station 110, the relay unit 120 and the indoor transceiver 130. The overall system design is shown in FIG. 1. There is no need to connect the multiple RUs deployed at different locations outdoor.

(i) Base Station

Figure 3:
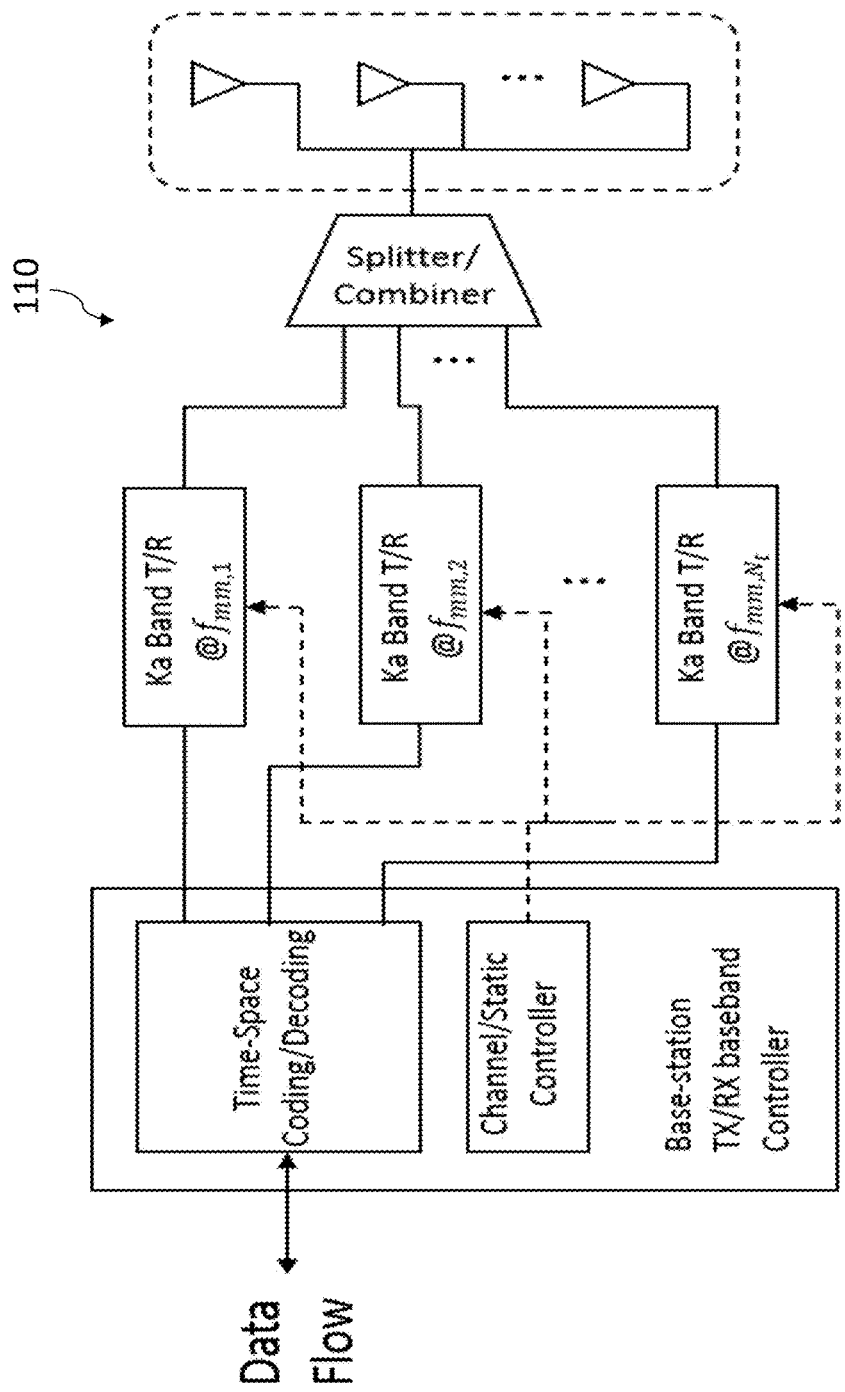
FIG. 3 illustrates a base station system in the M4R system in the present invention.

The BS 110 consists of multiple mmWave transceivers 112 and a high gain antenna or antenna array 114. The diagram of the overall BS system 110 is shown in FIG. 3.

Figure 4:
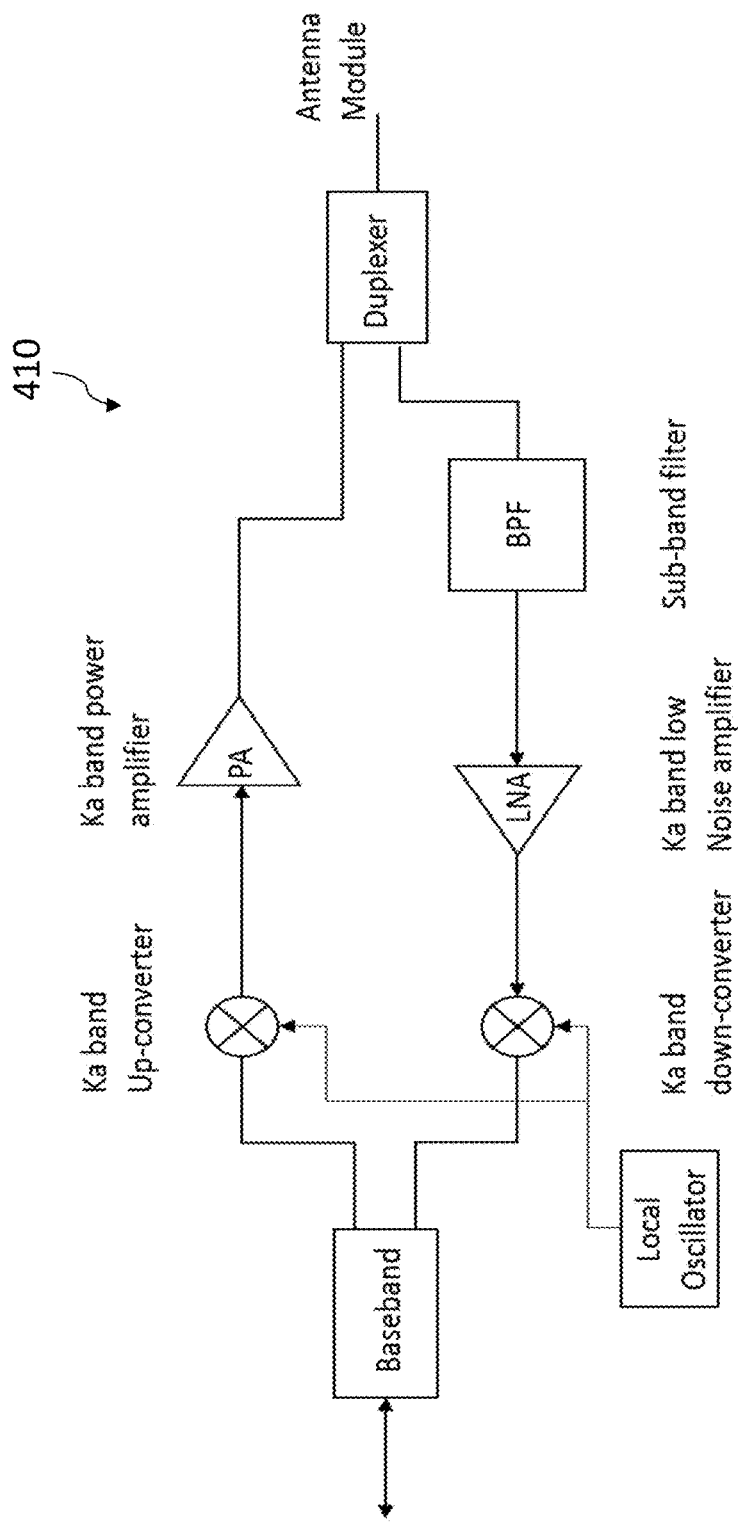
FIG. 4 illustrates a schematic view of a Ka band transceiver architecture.

The critical part of the BS system 110 is the mmWave band transceiver 112. For this example of implementation, the operating frequency can be selected to 38 GHz (Ka band). The same structure can be applied for other mmWave frequencies, such as 28 GHz or 60 GHz. FIG. 4 shows the design of one Ka Band transceiver architecture 410.

For the downlink path, the baseband signal processing module firstly applies time-space coding and converts the series baseband data flow into parallel channels. Each of the channel is mapped to one transceiver. A frequency allocation controller manages the local oscillators and assigns different carrier frequency to each transceiver. A Ka Band power amplifier is used to obtain enough transmitting power. Before sending the TX signal to the antenna module, a duplexer is inserted to separate the transmitting (downlink) and receiving (uplink) path.

Figure 5:
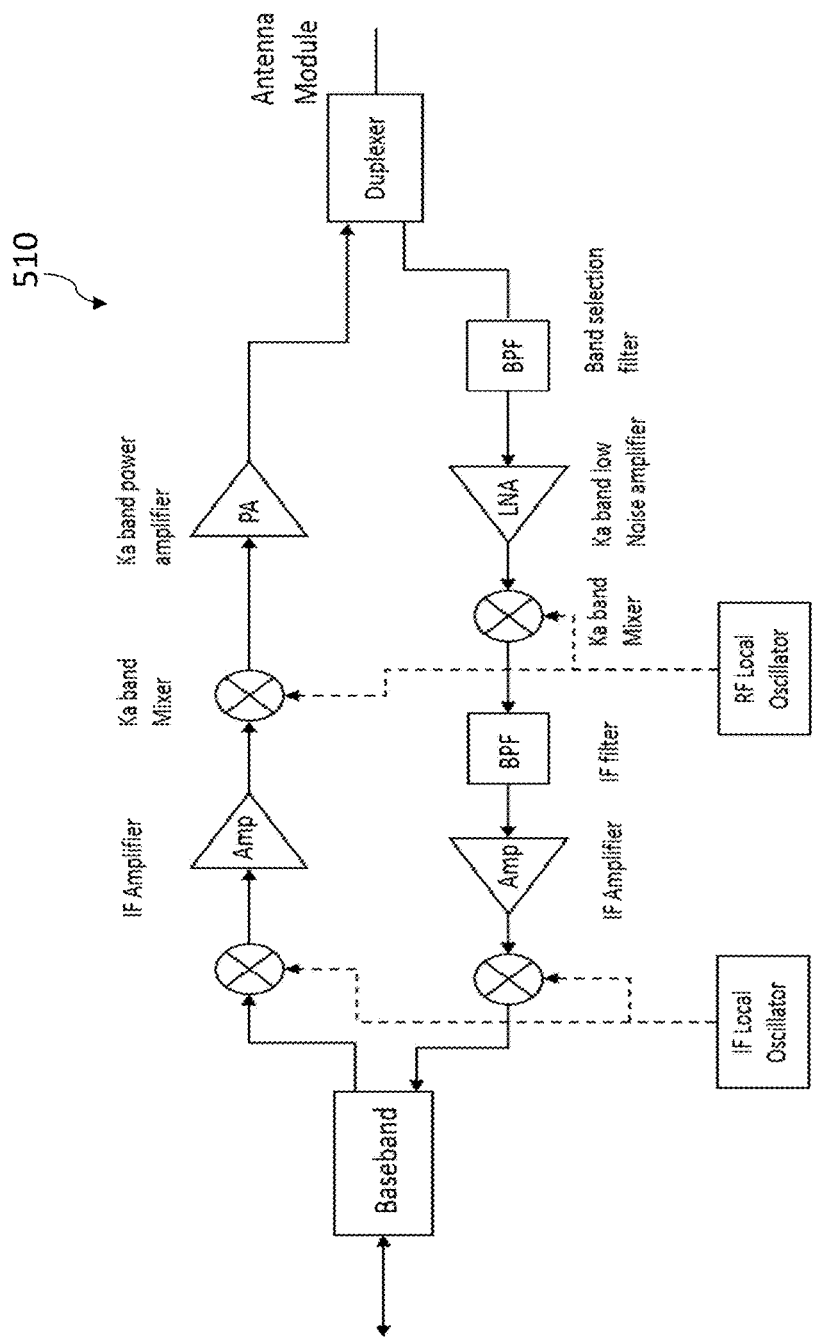
FIG. 5 illustrates a schematic view of a Ka band transceiver using heterodyne structure in the present invention.

For the uplink path, once the signal is captured by the antenna module, a Band Pass Filter (BPF) is used to retain the assigned sub-band and filter out the rests. A low noise amplifier (LNA) is used to strengthen the received signal with preserving a low noise figure. Then the RF signal is down converted to baseband and fed into signal processing module, which recovers the original data sending from indoor users by time-space-decoding. Note that for each transceiver unit shown in above, the BPF has to be aligned with the associated sub-band. Alternatively, a heterodyne receiver structure 510 allows using universal band selection filter and intermediate frequency (IF) BPF for all the channels, as shown in FIG. 5. Instead of directly converting the RF signal to baseband, the desired sub-band signal is down-converted to a fixed IF band and extracted by a fixed IF BPF. An IF amplifier is placed after the filter to compensate the conversion loss. By using this structure, all the Ka Band transceiver can share the identical hardware.

The Antenna module in the BS should provide high gain and beamforming capability. Possible implementation plan is using Ka Band phase array.

(ii) Relay Unit

Figure 6:
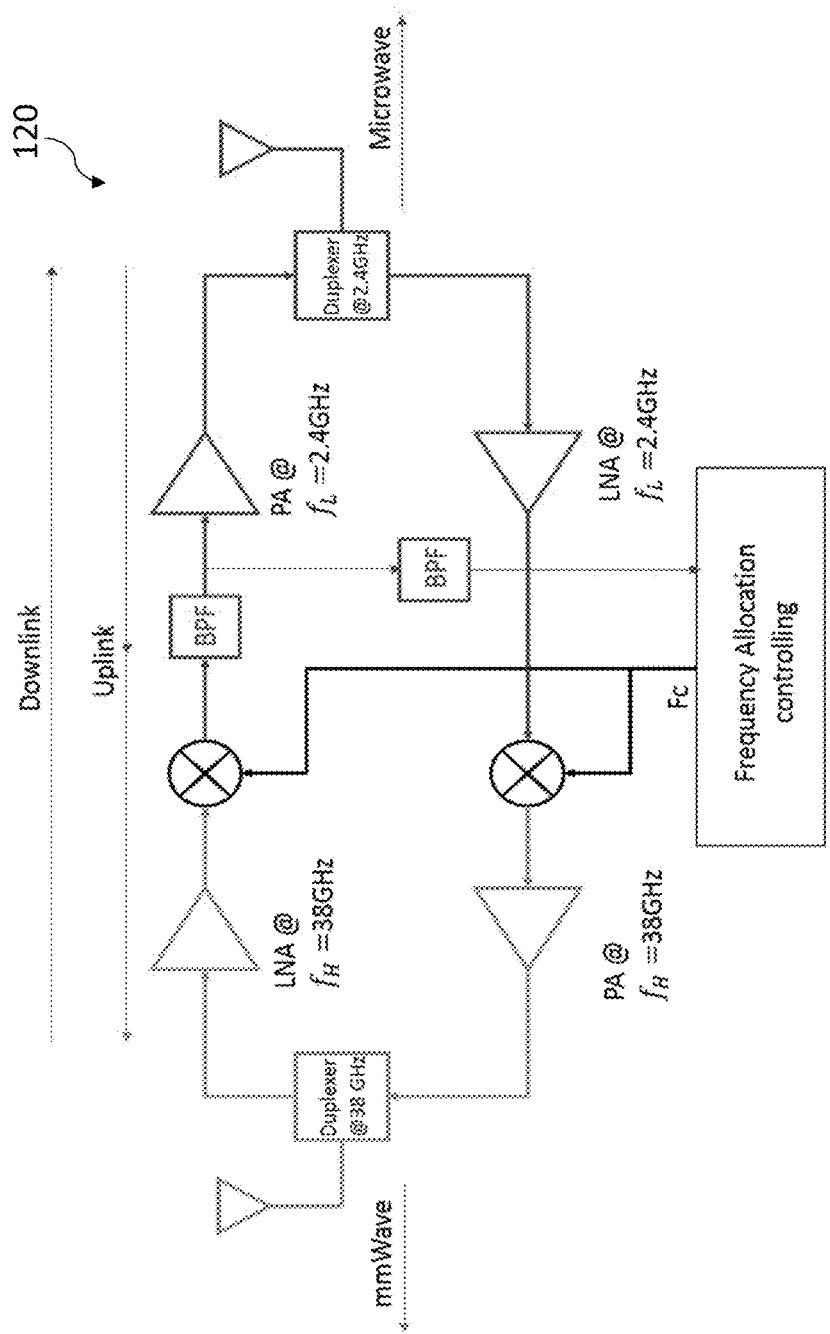
FIG. 6 illustrates a schematic view of a relay unit in the present invention.

The relay unit is the most fundamental block in the M4R system 100. Each RU 120 should relay a 2-way communication between BS 110 and ID-TRX 130. A block diagram of the RU 120 in the present invention is shown in FIG. 6.

In the downlink path, the signal transmitted from BS 110 is captured by an mmWave antenna, then amplified by a Ka Band LNA. The LNA is required to be broadband to accommodate all the sub-bands. Then the mmWave signal is down-converted to microwave band by a mixer. Since one mmWave sub-band is mapped to one RU 120, the RU 120 should take the specific carrier frequency and down converted the desired sub-band signal to low frequency carrier, such as 2.4 GHz shown in the diagram. The carrier frequency is managed by a frequency allocation controller, which receives commands from BS 110 and determines the carrier frequency of each RU 120 before starting the data communication. A microwave band BPF is used to extract the desired sub-band signal and eliminate the others. Following the BPF, a 2.4 GHz PA is used to create enough transmitting power. In the uplink path, the signal travels in opposite direction. The microwave band signal is amplified by 2.4 GHz LNA and up-converted to the associated sub-band, then amplified by Ka band PA. In the RU 120, two duplexers at Ka Band and 2.4 GHz are used to separate the uplink and downlink signal, as shown in FIG. 6. The other possible frequency for range microwave band is 3.5-3.6 GHz, the architecture of the RU 120 can be similar, one only needs to replace the RF components to those work at 3.5-3.6 GHz.

(iii) Indoor Transceiver

Figure 7:
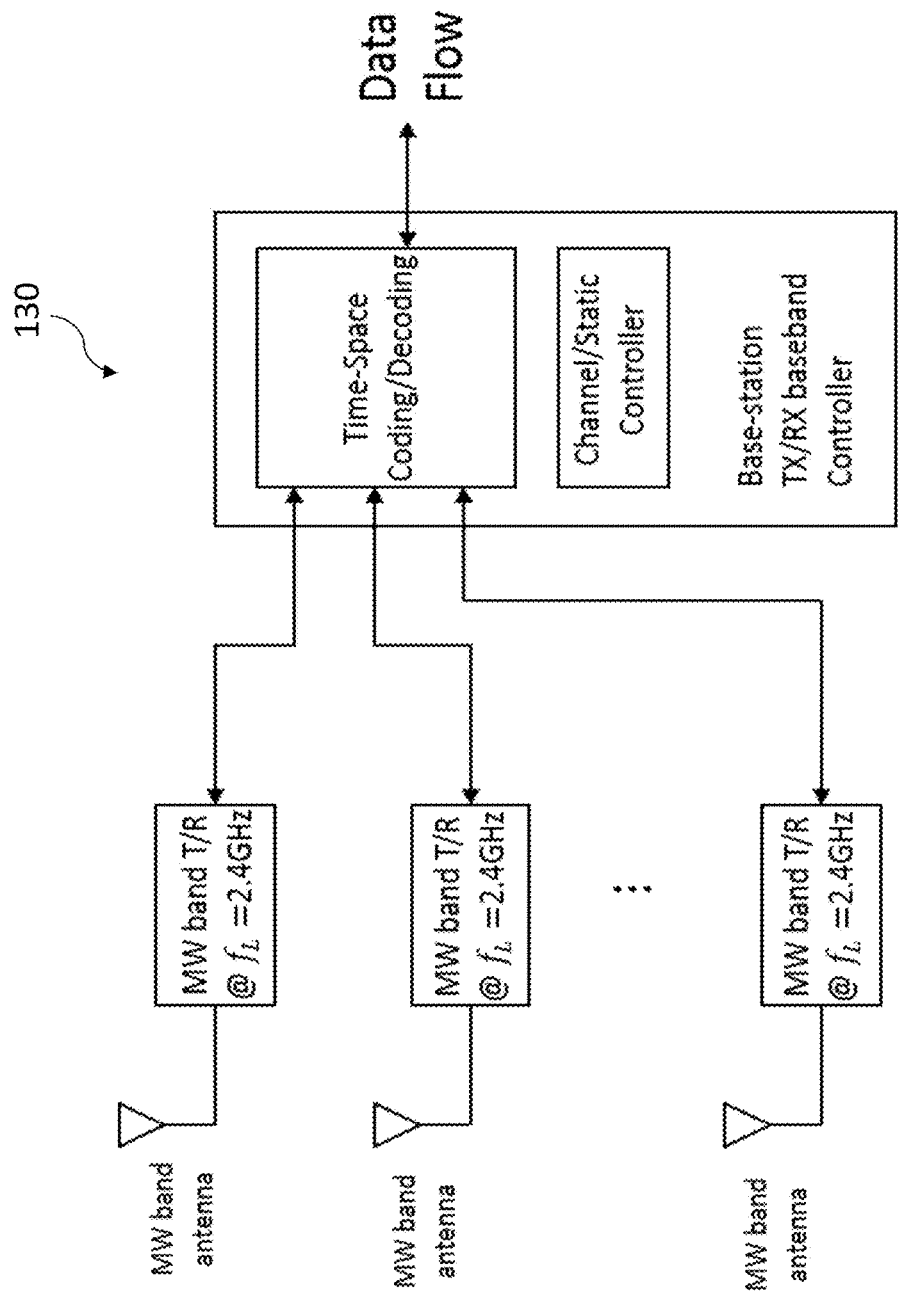
FIG. 7 illustrates a diagram of an indoor transceiver system in the present invention.

The diagram of the overall ID-TRX 130 is shown in FIG. 7. The ID-TRX system 130 has similar structure as the BS 110. But the indoor system contains multiple identical microwave transceivers which are operating at same frequency band around $f_L$. Each of the transceiver module has one microwave antenna.

Figure 8:
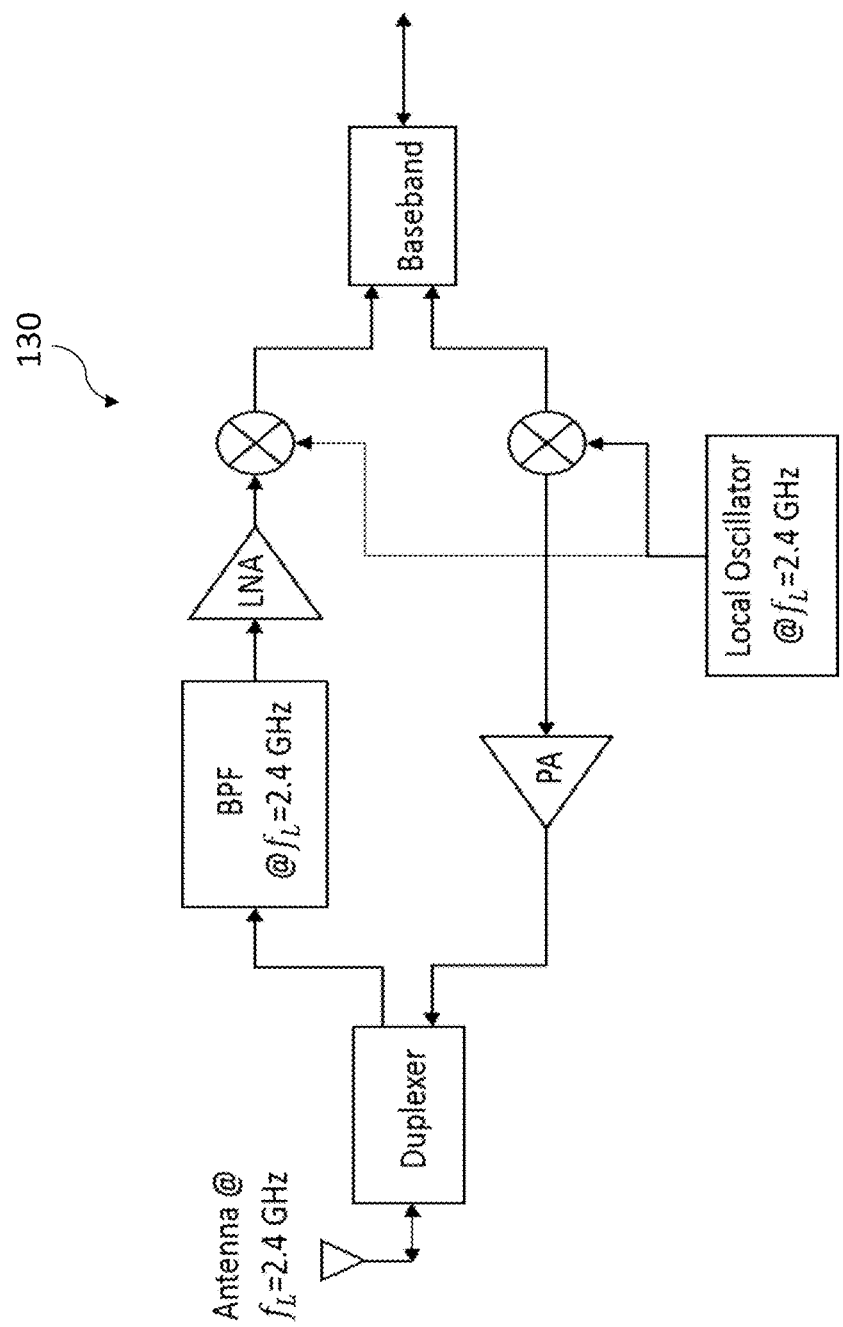
FIG. 8 illustrates a schematic view of an indoor transceiver unit in the present invention.

The details of the transceiver unit are shown in FIG. 8. All the components in the transceiver is set to operating for microwave signal at $f_L$, which can be 2.4 GHz or 3.5 GHz. For the downlink path, the received signal is filtered by the band selection BPF and amplified by the LNA, then down-converted to baseband. The baseband signals from all the transceivers are collected by the digital signal processer. The original data flow is recovered through time-space decoding. For the uplink path, the data to be transmitted is parallelized to multiple channels by time-space-coding, and sent into the transceivers.

(iv) Duplexer Implementation

The duplexers used in M4R system 100 can be implemented in various types depending on the communication protocols, such as time division, frequency division and full duplexing.

Having described the invention by the description and illustrations above, it should be understood that these are exemplary of the invention and are not to be considered as limiting. Accordingly, the invention is not to be considered as limited by the foregoing description, but includes any equivalent.

What is claimed is:

1. A system that employs a millimeter-wave (mmWave) to microwave Multiple-Input Multiple-Output (MIMO) relay in a wireless communication environment, comprising:
    a base station having a plurality of millimeter-wave (mmWave) transceivers;
    a relay unit located outside a building and configured to receive and amplify mmWave signals from the mmWave transceivers of the base station, and to down-convert the mmWave signals to a microwave signals to lower a penetration loss; and
    a plurality of indoor transceivers located inside the building and configured to operate for microwave signals, so that the relay unit and indoor transceivers configured to form a microwave MIMO link that operates in a spatial multiplexing manner.

2. The system of claim 1, wherein an operating frequency of the mmWave transceiver can be selected from 28 GHz, 38 GHz or 60 GHz.

3. The system of claim 1, wherein the base station has a baseband signal processing module that applies time-space coding and converts a series baseband data flow into a plurality of channels, and each of the channel mapped to one mmWave transceiver.

4. The system of claim 1, wherein the base station further comprises an antenna array.

5. The system of claim 1, wherein the relay unit has a mixer to down-convert the mmWave signals to microwave signals.

6. The system of claim 1, wherein the relay unit has a frequency allocation controller to receive commands from the base station and determine a carrier frequency of each relay unit.

7. The system of claim 1, wherein an operating frequency of the indoor transceivers can be 2.4 GHz or 3.5 GHz.

8. The system of claim 1, wherein the relay unit is operated in an analogue manner.

* * * * *